(12) United States Patent
Oberhofer et al.

(10) Patent No.: US 11,676,495 B2
(45) Date of Patent: Jun. 13, 2023

(54) DYNAMIC AUTONOMOUS VEHICLE MUTUALITY SUPPORT FOR AUTONOMOUS VEHICLE NETWORKS

(71) Applicant: International Business Machines Corporation, Armonk, NY (US)

(72) Inventors: Martin Oberhofer, Sindelfingen (DE); Sushain Pandit, Austin, TX (US); Fang Wang, Westford, MA (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 16/685,126

(22) Filed: Nov. 15, 2019

(65) Prior Publication Data
US 2021/0150910 A1 May 20, 2021

(51) Int. Cl.
*G08G 5/00* (2006.01)
*G08G 5/04* (2006.01)
(Continued)

(52) U.S. Cl.
CPC ......... *G08G 5/0008* (2013.01); *G08G 5/0052* (2013.01); *G08G 5/0069* (2013.01);
(Continued)

(58) Field of Classification Search
None
See application file for complete search history.

(56) References Cited

U.S. PATENT DOCUMENTS 9,973,939 B2 * 5/2018 Ross .................... G06V 20/176
10,013,884 B2 7/2018 Deluca
(Continued)

FOREIGN PATENT DOCUMENTS

WO 2014080388 A2 5/2014
WO 2014080387 A1 6/2014

OTHER PUBLICATIONS

Yanmaz et al., "Drone networks: Communications, coordination, and sensing", Ad Hoc Networks 68 (2018), © 2017 Elsevier, Available online Sep. 23, 2017, 15 pages.
(Continued)

*Primary Examiner* — Jelani A Smith
*Assistant Examiner* — Davin Seol
(74) *Attorney, Agent, or Firm* — Joseph P. Curcuru

(57) ABSTRACT

Embodiments of the present invention describe creating a mesh network of autonomous vehicles. Embodiments describe, for a set of autonomous vehicles configured to perform joint tasks, creating a plurality of subset networks of autonomous vehicles based on geographical proximity, wherein the plurality of subset networks of autonomous vehicles overlap to form a mesh network of autonomous vehicles, and wherein the mesh network of autonomous vehicles and the subset networks of autonomous vehicles support a non-centralized task assignment feature to assign tasks to autonomous vehicles in the mesh network. Additionally, embodiments describe sending a status signal to a first autonomous vehicle in the mesh network via a second autonomous vehicle in the mesh network, wherein the first autonomous vehicle is in a same subset network of autonomous vehicles as the second autonomous vehicle.

20 Claims, 4 Drawing Sheets

(51) Int. Cl.
  *H04W 4/40* (2018.01)
  *H04W 76/10* (2018.01)
  *H04W 84/18* (2009.01)
  *H04W 12/50* (2021.01)
  *H04W 12/63* (2021.01)

(52) U.S. Cl.
  CPC .............. *G08G 5/045* (2013.01); *H04W 4/40* (2018.02); *H04W 12/50* (2021.01); *H04W 12/63* (2021.01); *H04W 76/10* (2018.02); *H04W 84/18* (2013.01)

(56) References Cited

U.S. PATENT DOCUMENTS

| | | | | |
|---|---|---|---|---|
| 10,841,744 | B2* | 11/2020 | Patil | ............ B64C 39/024 |
| 2010/0027649 | A1 | 2/2010 | Chujoh | |
| 2014/0254896 | A1 | 9/2014 | Zhou | |
| 2015/0334768 | A1* | 11/2015 | Ranasinghe | .......... H04W 4/021 370/328 |
| 2016/0266579 | A1 | 9/2016 | Chen | |
| 2017/0092109 | A1 | 3/2017 | Trundle | |
| 2017/0195048 | A1* | 7/2017 | Sham | ................ H04N 7/22 |
| 2018/0184269 | A1* | 6/2018 | Christoval | ............ H04W 4/38 |
| 2018/0319495 | A1* | 11/2018 | Tu | ................ G05D 1/0011 |
| 2018/0327091 | A1 | 11/2018 | Burks | |
| 2020/0014759 | A1* | 1/2020 | Wunderlich | ....... G06Q 10/0635 |
| 2020/0126431 | A1* | 4/2020 | Luckey | ............. G05D 1/0094 |
| 2020/0322038 | A1* | 10/2020 | Mills | ............... H04W 4/90 |
| 2021/0160749 | A1* | 5/2021 | Lu | ................ H04W 36/245 |

OTHER PUBLICATIONS

Daniels, Jeff, "Amazon gets US patent for 'countermeasures' to protect drone delivery", CNBC, Dec. 21, 2016, 5 pages, <https://www.cnbc.com/2016/12/21/amazon-gets-us-patent-for-countermeasures-to-protect-drone-delivery.html>.

Dormehl, Luke, "Smart Security System Uses Drones To Guard Your House", Digital Trends, Nov. 5, 2016, 4 pages, <https://www.digitaltrends.com/cool-tech/sunflower-home-awareness-system/>.

* cited by examiner

DYNAMIC AUTONOMOUS VEHICLE MUTUALITY SUPPORT FOR AUTONOMOUS VEHICLE NETWORKS

BACKGROUND OF THE INVENTION

The present invention relates generally to the field of autonomous vehicle network technology, and more particularly to meshed autonomous vehicle networks.

An unmanned aerial vehicle (UAV) (or un-crewed aerial vehicle, commonly known as an autonomous vehicle) is an aircraft without a human pilot on board and a type of unmanned vehicle. UAVs are a component of an unmanned aircraft system (UAS); which include a UAV, a ground-based controller, and a system of communications between the two. The flight of UAVs may operate with various degrees of autonomy: either under remote control by a human operator or autonomously by onboard computers. UAV's can be used commercial, for scientific research, recreationally, agriculture. Additionally, UAV's can be used for surveillance, product deliveries, aerial photography, security, and autonomous vehicle racing.

UAVs typically fall into several functional categories (although multi-role airframe platforms are becoming more prevalent) such as: (i) target and decoy; (ii) reconnaissance; (iii) logistics; (iv) research and development; and (v) civil and commercial UAVs, agriculture, aerial photography, and data collection UAVs.

SUMMARY

Embodiments of the present invention disclose a method, a computer program product, and a system for creating a mesh network of autonomous vehicles, embodiments disclose: for a set of autonomous vehicles configured to perform joint tasks, creating a plurality of subset networks of autonomous vehicles based on geographical proximity, wherein the plurality of subset networks of autonomous vehicles overlap to form a mesh network of autonomous vehicles, and wherein the mesh network of autonomous vehicles and the subset networks of autonomous vehicles support a non-centralized task assignment feature to assign tasks to autonomous vehicles in the mesh network; and sending a status signal to a first autonomous vehicle in the mesh network via a second autonomous vehicle in the mesh network, wherein the first autonomous vehicle is in a same subset network of autonomous vehicles as the second autonomous vehicle.

DETAILED DESCRIPTION

Figure 1:
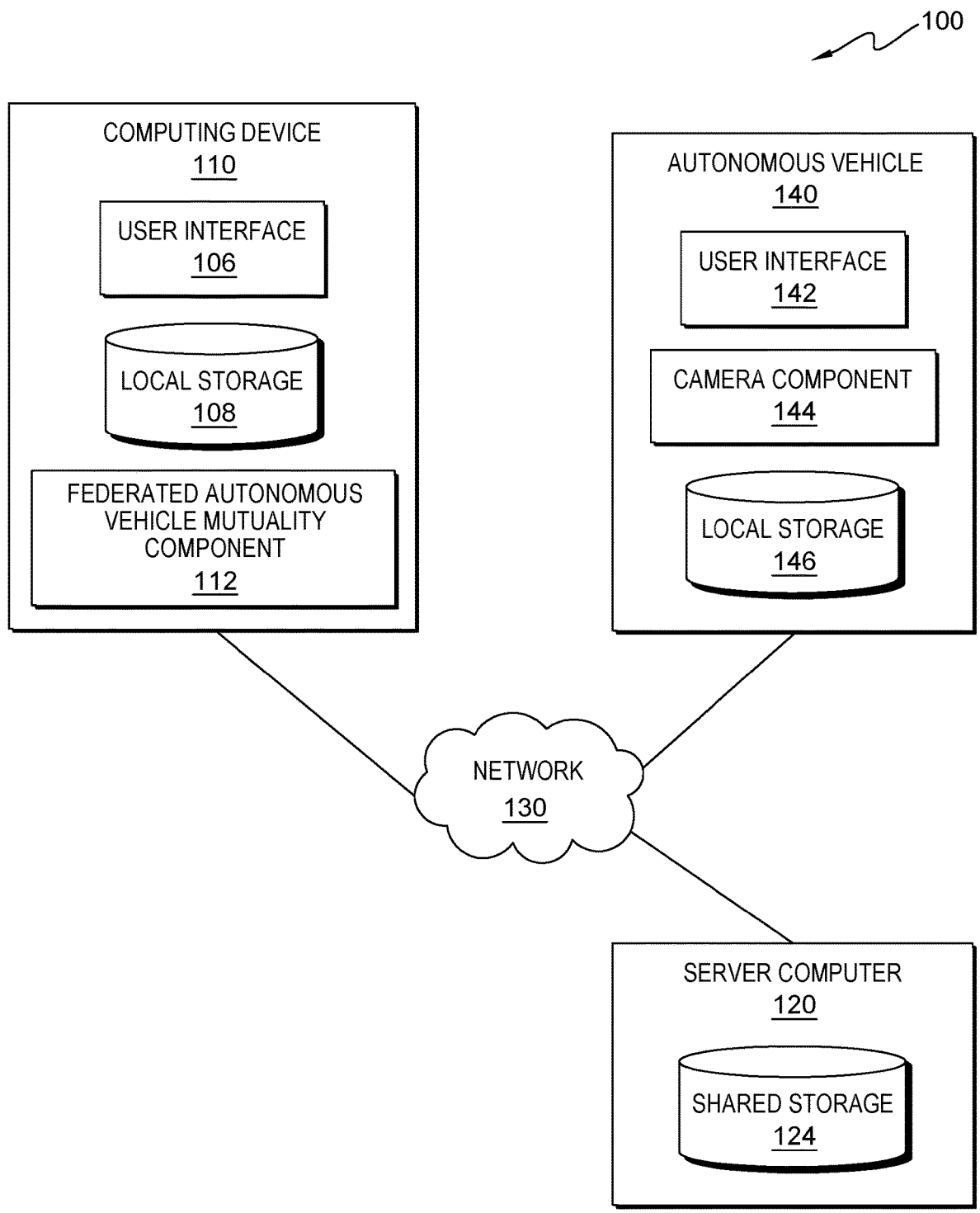
FIG. 1 is a functional block diagram illustrating a distributed data processing environment, in accordance with an embodiment of the present invention.

Embodiments of the present invention can provide a novel approach for unmanned aerial vehicles, or autonomous vehicles, operating to mutually support completion of an assigned task (e.g. to identify, monitor, and/or follow objects across individual flight boundaries with a federated, or united, approach to extend the service coverage of individual autonomous vehicles. Individual flight boundaries may exist according to maximal flight time rules, battery operation constraints, network range, or other constraints, whether limited by policy or by physical limitations. The united approach to performing assigned tasks with autonomous vehicles as illustrated herein provides for notification of other autonomous vehicles in the communications network (paired autonomous vehicles, meshed network, circle of trust) when one autonomous vehicle is disabled or otherwise unable to perform an assigned task.

Some embodiments of the present invention are directed to notifying interested parties (owners, serviced customers, and/or administrators) of the statuses of networked autonomous vehicles including, but not limited to: (i) physical condition; (ii) airborne; (iii) inactive; (iv) grounded, (v) monitoring surroundings; and (v) on task. Some embodiments of the present invention continuously update interested parties on the current location of autonomous vehicles within the network or provide notice when task milestones are reached or when other events occur during completion of assigned tasks. Some embodiments of the present invention provide for continuous communication between networked autonomous vehicles such that the status of each networked autonomous vehicle is reported to the other autonomous vehicles while completing assigned tasks. Status reports include, but are not limited to: low battery, standing by, on task, recording events, and offline.

Conventionally sensors are deployed on an autonomous vehicle to detect motion, vibration, and sound provide for an autonomous vehicle to perform monitoring tasks within a flight boundary and to issue an alert notification responsive to monitored events. Some embodiments of the present invention recognize that according to conventional practice if an alert notification is triggered by a sensor, interested parties have to engage the autonomous vehicle to determine what triggered the sensors. Some embodiments of the present invention recognize that use of single autonomous vehicles to perform certain tasks limits the outcome of the tasks in at least the following ways: (i) the sensors of an autonomous vehicle do not trigger notifications based on a distinction between a registered object and an unregistered object; (ii) the range of the control signal and power supply for an individual autonomous vehicle is limited (e.g., they regularly need to return to recharge or can go out of communication range); and/or (iii) individual autonomous vehicles can become disabled during use.

Some embodiments of the present invention can create a mesh of paired autonomous vehicles, in which the mesh of paired autonomous vehicles can comprise two or more autonomous vehicles. Embodiments of the present invention can enable intelligent task relay overcoming the battery limit by passing/relaying an assigned task from one autonomous vehicle to the next using discrete autonomous vehicle coverage networks (e.g., meshed autonomous vehicle network, circle of trust). Embodiments of the present invention can send one or more status signals to one or more paired autonomous vehicles. In various embodiments of the present invention, if one or more autonomous vehicles becomes disabled, the paired neighboring autonomous vehicles can be notified. Notification, in some embodiments, is the lack of a continuous signal indicating that the autonomous vehicle is active, or not disabled. Alternatively, notification is achieved by failure to send a periodic signal indicating that the autonomous vehicle is active, or not disabled. Additionally, embodiments of the present invention can continuously update the relayed task status to the interested parties. Embodiments of the present invention can improve the current state of the art by extending individual autonomous vehicle tasks to multiple networked autonomous vehicles by passing an assigned task and task status from one autonomous vehicle to the next autonomous vehicle within the network. In that way, the individual battery span and control range of a single autonomous vehicle is no longer a limiting factor for accomplishing an assigned task.

It should be noted herein that in the described embodiments, participating parties have consented to having their images uploaded and saved and being recorded and monitored, and participating parties are aware of the potential that such recording, tracking, and monitoring may be taking place. In various embodiments of the present invention, for example, when downloading or operating an embodiment of the present invention, the embodiment of the invention presents a terms and conditions prompt that enables the interested parties to opt-in or opt-out of participation.

For example, runners participating in a long-distance marathon. When runners sign up for the race a terms and agreement document that is presented to the runners (i.e., participants). In this example, in order to participate in the race the participants must opt-in or opt-out of the terms and agreements. In this example, the spectators agree to the terms and conditions (i.e., opt-in) and register for the race. In this example, all the terms and agreement outlined in the document are presented to the spectators again by an official representative the day of the race.

Implementation of embodiments of the invention may take a variety of forms, and exemplary implementation details are discussed subsequently with reference to the figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, unmanned aerial vehicle (UAV 140) and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In various embodiments of the present invention, network 130 can be a peer to peer (P2P) network. In general, network 130 can be any combination of connections and protocols that will support communications between computing device 110, federated autonomous vehicle mutuality component (autonomous vehicle mutuality component) 112, UAV 140, local storage 108, shared storage 124, server computer 120, any other computing devices or other storage devices (not shown in FIG. 1), or any combination therein within distributed data processing environment 100.

In various embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with drivers of other computing devices via network 130, capable of executing machine-readable program instructions and communicating with server computer 120 and/or UAV 140.

In other embodiments, computing device 110 can represent any programmable electronic computing device or combination of programmable electronic computing devices capable of executing machine readable program instructions, manipulating executable machine-readable instructions, and communicating with server computer 120, UAV 140, and other computing devices (not shown) and other UAV's (not shown) within distributed data processing environment 100 via a network, such as network 130. In the depicted embodiment, computing device 110 can include user interface (interface) 106 and local storage 108. In various embodiments of the present invention, not depicted in FIG. 1, computing device 110 can have one or more user interfaces. In other embodiments, not depicted in FIG. 1, distributed data processing environment 100 can comprise one or more computing devices, one or more server computers, and/or one or more networks. In various embodiments of the present invention, computing device 110 can be in or integrated with a smart room. Computing device 110 can include internal and external hardware components, as depicted, and described in further detail with respect to FIG. 4.

Interface 106 provides an interface for computing device 110 and enables participants to interact with autonomous vehicle mutuality component 112 via network 130. interface 106 enables the interested parties to interact with computing device 110, server computer 120, UAV 140 or any combination thereof. For example, a computer system and display screen enabling an autonomous vehicle operator to view and control camera on the autonomous vehicle and speak to an object of interest (i.e., object) using the microphone and speaker on the autonomous vehicle. interface 106 enables the interested parties to send program instructions, receive program instructions, send messages, receive messages, update data, send data, input data, edit data, collect data, receive data, or any combination thereof from a server or a program.

In one embodiment, interface 106 can be a graphical user interface (GUI) or a web user interface (WUI) and can display text, documents, web browser windows, driver options, application interfaces, and instructions for operation. interface 106 can include information such as graphic, text, and sound. interface 106 can enable a program to be presented to a driver and enable control sequences the driver employs to control the program. In another embodiment, interface 106 can be a mobile application software providing an interface between a user of UAV 140, computing device 110, and server computer 120. Mobile application software, or an "app," can be a computer program designed to run on smart phones, tablet computers and other computing devices. In an embodiment, interface 106 can enable the user (interested parties) of computing device 110 to send data, input data, edit data (annotations), collect data and/or receive data.

UAV 140 can be any type of UAV known in the art. In the depicted embodiment, UAV 140 comprises interface 142, camera component 144, and local storage 146. In some embodiments, not depicted in FIG. 1, UAV 140 can comprise of a lighting component, a speaker component, a microphone component and/or an interface. In various embodiments of the present invention, the microphone and speaker component can enable the interested parties speak to and listen with objects interacting with the autonomous vehicles. In various embodiments of the present invention, the speakers can initiate a siren or an alarm, issue a pre-recorded message, and/or emit a sound or noise (e.g., music, animal sounds, etc.). In some embodiments, the lighting component can flash, strobe, and/or create a spotlight to follow objects of interest (e.g., participants) and/or other autonomous vehicles.

Interface 142 provides an interface for UAV 140 and enables participants to interact with autonomous vehicle mutuality component 112 via network 130. Interface 142 enables the interested parties to interact with computing device 110, server computer 120, UAV 140 or any combination thereof. For example, a computer system and display screen enabling an autonomous vehicle operator to view and control camera on the autonomous vehicle and speak to an object of interest using the microphone and speaker on the autonomous vehicle. Interface 142 enables the interested parties to send program instructions, receive program instructions, send messages, receive messages, update data, send data, input data, edit data, collect data, receive data, or any combination thereof from a server or a program.

In one embodiment, interface 142 can be a graphical user interface (GUI) or a web user interface (WUI) and can display text, documents, web browser windows, driver options, application interfaces, and instructions for operation. Interface 142 can include information such as graphic, text, and sound. Interface 142 can enable a program to be presented to a driver and enable control sequences the driver employs to control the program. In another embodiment, interface 142 can be a mobile application software providing an interface between a user of UAV 140, computing device 110, and server computer 120. Mobile application software, or an "app," can be a computer program designed to run on smart phones, tablet computers and other computing devices. In an embodiment, interface 142 can enable the user (interested party) of UAV 140 to send data, input data, edit data (annotations), collect data and/or receive data.

Camera component 144 can be any type of camera known in the art. In the depicted embodiment camera, component 144 executes on UAV 140. In other embodiments, camera component 144 can reside elsewhere within distributed data processing environment 100, provided that camera component 144 can access at least one of UAV 140, computing device 110, and server computer 120 and is accessible by at least one of UAV 140, computing device 110, and server computer 120.

Server computer 120 can be a standalone computing device, a management server, a web server, a mobile computing device, a central server, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 4.

Each of shared storage 124, local storage 146, and local storage 108 can be a data/knowledge repository and a database that can be written and read by one or a combination of autonomous vehicle mutuality component 112, server computer 120, and computing device 110. In the depicted embodiment, shared storage 124 executes on server computer 120, local storage 146 executes on UAV 140, and local storage 108 executes on computing device 110. In another embodiment, shared storage 124, local storage 146, and local storage 108 can each reside elsewhere within distributed data processing environment 100, provided that each can access at least one of computing device 110 and server computer 120 and each are accessible by at least one of computing device 110 and server computer 120. Shared storage 124, local storage 146, and local storage 108 can each be implemented with any type of storage device capable of storing data and configuration files that can be accessed and utilized by UAV 140, server computer 120, computing device 110, or any combination thereof, such as, but not limited to, a database server, a hard disk drive, or a flash memory. In other embodiments, shared storage 124, local storage 146, and local storage 108 can each be a hard drive, a memory card, a computer output to laser disc (cold storage), or any form of data storage known in the art. In some embodiments, shared storage 124, local storage 146, and local storage 108 can each be one or more cloud storage systems or databases linked to a cloud network.

In the depicted embodiment, autonomous vehicle mutuality component 112 executes on server computing device 110. In other embodiments, autonomous vehicle mutuality component 112 can execute on server computer 120, one or more UAVs 140, one or more computing devices 110 or one or more server computers 120 (not depicted in FIG. 1), or anywhere within distributed data processing environment 100, provided that autonomous vehicle mutuality component 112 can access at least one of computing device 110, UAV 140, and server computer 120, and is accessible by at least one of computing device 110, UAV 140, and server computer 120. In some embodiments, autonomous vehicle mutuality component 112 can be on one or more servers, one or more computing devices, or any combination thereof. In some embodiments, not depicted in FIG. 1, autonomous vehicle mutuality component 112 can be a standalone component on computing device 110.

In various embodiments of the present invention, autonomous vehicle mutuality component 112 can manage waypoint navigation (e.g., such as self-deploy and self-takeover) in order to complete a task within an identified area within predefined time windows. In various embodiments of the present invention, autonomous vehicle mutuality component 112 can create a mesh of paired autonomous vehicles, wherein the mesh of pared autonomous vehicles can pair together to form a network of UAVs. Pairing can be any form of syncing, linking, and/or connecting known in the art, as long as the UAVs can communicate with one another and/or the interested parties. The mesh network of paired autonomous vehicles is described in detail in FIG. 2. In various embodiments of the present invention, autonomous vehicle mutuality component 112 can create one or more subset networks of autonomous vehicles based on the geographical proximity of the autonomous vehicles, wherein the one or more subset networks overlap to form a mesh network. In some embodiments, the geographical proximity can be predetermined and/or based on a formed circle of trust and paired neighboring autonomous vehicles. In various embodiments of the present invention, autonomous vehicle mutuality component 112 can instruct one or more autonomous vehicles in the mesh network to continuously communicate and update other autonomous vehicles in the respective subset networks of task status and autonomous vehicle status.

In various embodiments of the present invention, autonomous vehicle mutuality component 112 can enable intelligent task relay to relay an assigned task from the current autonomous vehicle to a neighboring autonomous vehicle in the meshed network, to overcome the limitation of an individual flight boundary. For example, after participants opt-in to be tracked and filmed for a televised long-distant marathon, a first autonomous vehicle tracks and records the participants (i.e., marathon runners). In this example, the battery monitor on the first autonomous vehicle indicates that the battery is running low. In this example, the first autonomous vehicle issues a signal to the paired autonomous vehicles in the mesh network that indicates the first autonomous vehicle is reaching an individual flight boundary. In this example, the autonomous vehicle nearest to the first autonomous vehicle responds to the issued signal by indicating that it has received the task from the first autonomous vehicle and will continue tracking the marathon runners. In this particular example, the task hand-off/relay can continue as long as there are autonomous vehicles in the area associated within the mesh network. In some embodiments, if the first autonomous vehicle notifies other autonomous vehicles within the network that it is disable, whether by not sending an expected signal or otherwise, a second autonomous vehicle associated with the network can perform a predefined action responsive to the first autonomous vehicle being disabled (e.g., move to the last known position of the first autonomous vehicle) or receive instructions from an interested party.

In some embodiments, autonomous vehicle mutuality component 112 can send one or more status signals to one or more paired autonomous vehicles. In various embodiments of the present invention, if one or more autonomous vehicles becomes disabled for any reason then autonomous vehicle mutuality component 112 can notify the paired neighboring autonomous vehicles and instruct the paired neighboring autonomous vehicles to investigate the disabled autonomous vehicle and/or alert an interested party. Additionally, in various embodiments of the present invention, autonomous vehicle mutuality component 112 can continuously update the relayed task status to an interested party. For example, autonomous vehicle mutuality component 112 continuously updates a research team operating the autonomous vehicle of the relayed task status for a predetermined amount of time. In various embodiments of the present invention, autonomous vehicle mutuality component 112 can improve the current art by preventing the disabling of autonomous vehicle task service or task status through disabling a single autonomous vehicle and extending autonomous vehicle tasks by passing control from one autonomous vehicle to the next since, for example, the battery span of a single autonomous vehicle is no longer a limiting factor under embodiments of the present invention.

In various embodiments of the present invention, autonomous vehicle mutuality component 112 can enable autonomous vehicles in the mesh network to follow an object of interest across individual flight boundaries. In one particular embodiment of the present invention, autonomous vehicle mutuality component 112 can follow an object of interest by determining if a notify signal has been received, wherein a notify signal is a signal that one or more autonomous vehicles in the mesh network send to each other to alter any current or upcoming events or to notify the other autonomous vehicles of the current or upcoming events. In this particular embodiment, if autonomous vehicle mutuality component 112 receives a notify signal then autonomous vehicle mutuality component 112 can activate the live video feed provided by camera component 144 and can display the live video feed to the interested party, via interface 106 and store the live feed on local storage 108, shared storage 124, and/or local storage 146. In this particular embodiment, if autonomous vehicle mutuality component 112 does not send a notify signal, then autonomous vehicle mutuality component 112 continues sending the status relay signal to the autonomous vehicles in the mesh network. In this particular embodiment, autonomous vehicle mutuality component 112 can take a picture of the object triggering the notify signal. Alternatively, an image of the surrounding environment is stored when a notify signal is triggered.

In one particular embodiment of the present invention, autonomous vehicle mutuality component 112 can determine if an object is associated with an assigned task. In this particular embodiment, if autonomous vehicle mutuality component 112 determines the object is not associated with the assigned task, autonomous vehicle mutuality component 112 notifies the task autonomous vehicle and the task autonomous vehicle proceeds with the assigned task. However, in this particular embodiment, if autonomous vehicle mutuality component 112 determines the object is associated with the assigned task, the mutuality component notifies the networked autonomous vehicle nearest the task autonomous vehicle that an object associated with the assigned task was identified by the task autonomous vehicle. Alternatively, if the object is associated with the assigned task, the task autonomous vehicle is instructed to record the location of the object and to proceed with the assigned task. Alternatively, the object being associated with the assigned task requires the task autonomous vehicle to stop performing the assigned task and to keep track of the identified object.

In one particular embodiments, while keeping track of an object of interest, autonomous vehicle mutuality component 112 can perform the following activities for every predetermined interval of time: report the location of the identified object; determine the direction of movement of the object by comparing previous and current positions; identify nearest autonomous vehicle toward which the object moving; determine the minimal distance to intersection with the nearest autonomous vehicle is not reached and continue tracking or determine the minimal distance to the intersection with the nearest autonomous vehicle is reached and pass control/task relay the current task to the closest autonomous vehicle in the neighboring cluster; send position update to interested parties in predetermined time intervals; and communicate with networked autonomous vehicles in one or more clusters by exchanging position, direction of travel, and speed of travel. The minimal distance to the intersection with the autonomous vehicle can be a predetermined distance or predetermined geographical location from the location of the task autonomous vehicle to an individual flight boundary of the task autonomous vehicle where the nearest autonomous vehicle is located.

Figure 2:
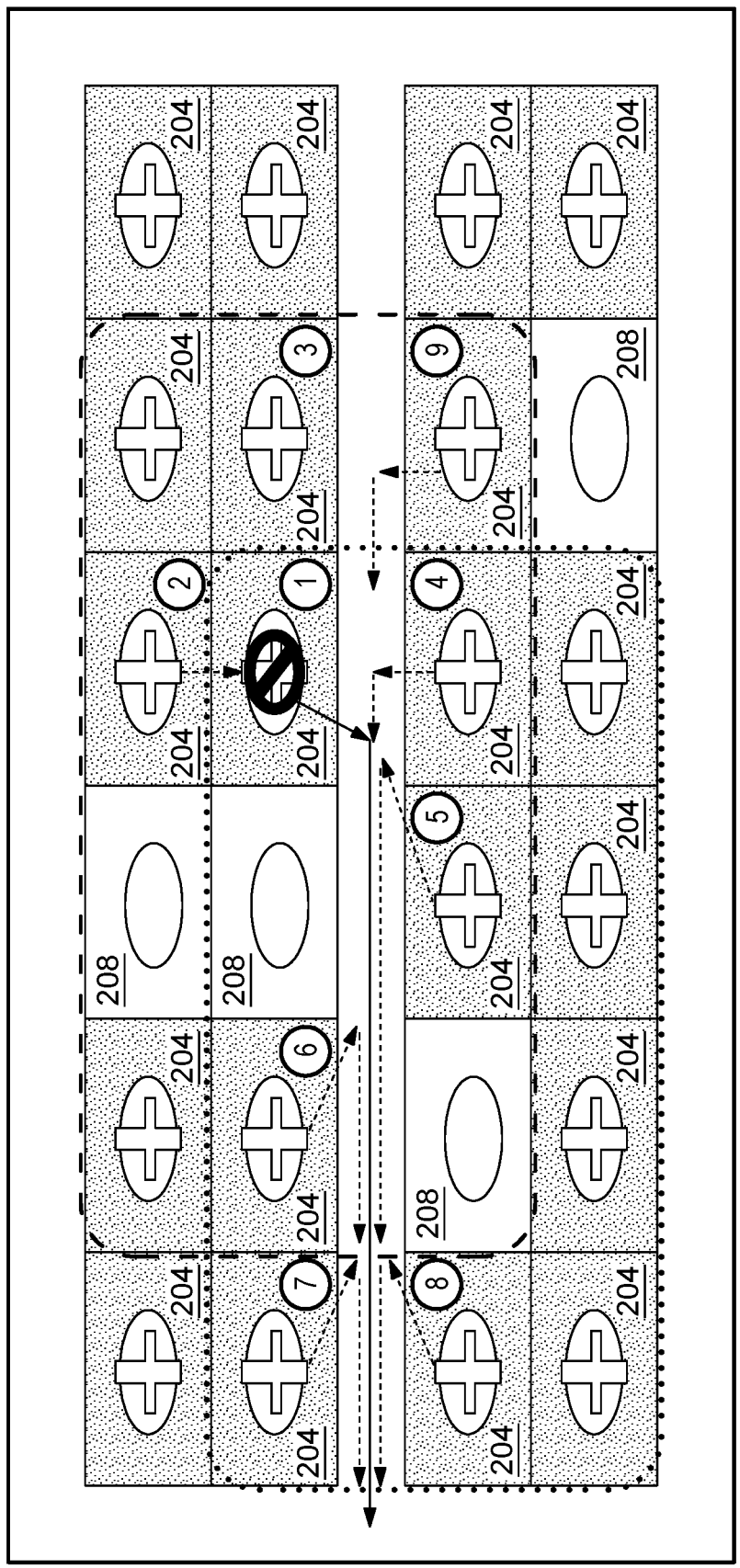
FIG. 2 is an example of a meshed autonomous vehicle network under a federated autonomous vehicle mutuality component within the distributed data procession environment of FIG. 1, in accordance with one example of the present invention.

FIG. 2 is an example of a meshed autonomous vehicle network under a federated autonomous vehicle mutuality component within the distributed data procession environment of FIG. 1, in accordance with one example of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

Referring to FIG. 2, the autonomous vehicle service requesters are represented by shaded regions 204. In this example, the unshaded regions 208 represent regions where no autonomous vehicle service is provided. In this particular example, using autonomous vehicle mutuality component 112, via a mobile application/online website on computing device 110, interested parties, such as the service requesters, can both view and communicate with the autonomous vehicles of the neighboring service requesters and they can determine the circle of trust for their autonomous vehicle. In some embodiments of the present invention, viewing autonomous vehicles includes viewing autonomous vehicle capabilities and/or capacities. In some embodiments of the present invention, deciding on the circle of trust involves pairing certain autonomous vehicles within communication range through an authentication process. Autonomous vehicles may be paired for use in a circle of trust according to characteristics, capabilities, and capacities of the autonomous vehicles. That is, a service requester may seek to include autonomous vehicles having specified carrying capacities in the circle of trust. In some embodiments of the present invention, each user pairs their autonomous vehicle with a neighboring autonomous vehicle using a two-step authentication process. In various embodiments of the present invention, paired autonomous vehicles continuously exchange status signals, wherein the absence of the status signal can trigger the paired autonomous vehicles to inspect the area where the autonomous vehicle was last located when it no longer communicated a status signal.

In the example provided in FIG. 2, the autonomous vehicle service requesters of area 1 paired an autonomous vehicle with the neighboring autonomous vehicles inside dashed box 210. Similarly, the autonomous vehicle service requesters of area 5 paired an autonomous vehicle with the neighboring autonomous vehicles in dotted box 212 resulting in a mesh of overlapping autonomous vehicle networks, 210 and 212. In this example, one or more interested parties can register one or more autonomous vehicles with autonomous vehicle mutuality component 112. In this particular example, autonomous vehicle mutuality component 112 can decide based on the GPS location of the autonomous vehicle's power station the radius of how far the autonomous vehicle is visible for pairing. The range around the GPS location of the autonomous vehicle mimics the circle of trust among people in the real world. For example, a person usually knows the neighbors on the street but not necessarily the neighbors four streets away. Therefore, instead of using a radius, alternatively in one embodiment, listed autonomous vehicles can be granted on a ratio of 1:1 basis pairing option if the autonomous vehicle owner lists his or her identity so the explicit choices can be made with whom the autonomous vehicles can be paired in order to form the mesh networks. For example, autonomous vehicle-1, associated with area 1, and autonomous vehicle-3, associated with area 3, can be explicitly selected to be paired together so autonomous vehicle-3 can relay autonomous vehicle-1's left-right moving task. In another example, autonomous vehicle-1 and autonomous vehicle-5 can be explicitly selected to be paired together so autonomous vehicle-5 may relay autonomous vehicle-1's right-left moving task.

In various embodiments of the present invention, during the circle of trust, one or more autonomous vehicles in the mesh network can be nodes on a graph and the pairing between two autonomous vehicles represents an edge of the graph. Ensuring that two clusters of autonomous vehicles overlap to some extent requires at least one edge connecting the underlying graphs of the one or more clusters, otherwise two clusters of autonomous vehicles are disjointed. Therefore, in the depicted embodiment, autonomous vehicle mutuality component 112 can develop at least one path to a neighboring cluster to ensure the task can pass from one cluster to the next. Thus, in the depicted embodiment, autonomous vehicle mutuality component 112 can test if there is at least one edge between two clusters to relay and pass control from one autonomous vehicle or cluster to a neighboring autonomous vehicle or cluster in the mesh network. In this particular embodiment, if that's not the case, then autonomous vehicle mutuality component 112 can suggest via a responsive prompt or notification instructing the user to add another autonomous vehicle based on geographic proximity to create the edge connection.

In various embodiments of the present invention, in order to perform maintenance (change the battery, repair a rotor, etc.) the autonomous vehicle can send the paired autonomous vehicles a special "Away for a while" signal (i.e., status signal) to avoid a notification or alert. Once the maintenance is done the autonomous vehicle can reenter the network of paired autonomous vehicles and issue a special "I am back" signal followed by the "I am alive" signal. In various embodiments of the present invention, autonomous vehicle mutuality component 112 can enable the interested parties to ignore certain objects identified during performance of a task.

In the depicted embodiment, illustrated by FIG. 2, autonomous vehicle mutuality component 112 can instruct one or more autonomous vehicles to launch and activate real-time video feeds, via camera component 144. In the depicted embodiment, one or more autonomous vehicles can detect an object while performing a task. In the depicted embodiment, autonomous vehicle mutuality component 112 enables the one or more autonomous vehicles to notify the interested party. The notification can include an image of the identified object and a predetermined text and/or audio notification. In the depicted embodiment, autonomous vehicle mutuality component 112 enables one or more autonomous vehicles to send one or more notifications to the closest neighboring autonomous vehicles. For example, based on FIG. 2, the closest neighboring autonomous vehicles to the autonomous vehicle on area 1 are the autonomous vehicles on area 2, 3, 4, 5, 6 and 9, wherein the notification would trigger the autonomous vehicles on area 2, 3, 4, 5, 6 and 9 to launch and fly towards the area 1. In this particular example, when the autonomous vehicle on area 1 is disabled due to a dying battery, before an alert is sent out to say that the battery is dying, the lack of an "I am active" signal will alert neighboring autonomous vehicles in the network of a likely disabled condition of the autonomous vehicle on area 1.

In the depicted embodiment, when a detected object is moving, the autonomous vehicle tracks the object. In the depicted embodiment, autonomous vehicle mutuality component 112 enables the paired autonomous vehicles to communicate amongst each other to keep a safe distance from each other while performing a task. Since each autonomous vehicle has a maximum range/flight time from the area respectively, autonomous vehicle mutuality component 112 enables a first autonomous vehicle to track the object and enable a task relay from the first autonomous vehicle to the next paired one or more autonomous vehicles, in which the next paired one or more autonomous vehicles can take over the tracking task (i.e., enables the transfer of the assigned task to another autonomous vehicle in the meshed network).

For example, in FIG. 2, the autonomous vehicle of having individual flight boundary 5 (autonomous vehicle-5) is notified that a group of marathon runners have enter into leg two (area 5) of the race. In this example, autonomous vehicle-5 would track the marathon runners, represented by the solid arrows, roughly until autonomous vehicle-5 starts to become out of range and issues a status notification to autonomous vehicles in the mesh network requesting assistance. In this example, autonomous vehicle-5 issues the status notification in close proximity to area 8. In this example, the autonomous vehicle associated with area 8 (autonomous vehicle-8) receives the status notification and issues a notification response instructing the other autonomous vehicles in the network including autonomous vehicle-5 that it has accepted the task and will being performing the task (tracking the marathon runners). In this particular example, the autonomous vehicle associated with area 9 stops tracking the fish cat at the end of the area 5 and relays its task to autonomous vehicle-5. In this particular example, while an autonomous vehicle is following the marathon runners, the autonomous vehicles send their position regularly to interested parties (e.g., autonomous vehicle owners and/or conservation scientists) to keep the interested parties aware and updated of the location and direction the object of interest is traveling. In the depicted embodiments, given the overlapping meshes (e.g., dashed box and dotted box) of paired autonomous vehicles there is continuous coverage where autonomous vehicles can relay task responsibilities to the neighboring autonomous vehicles in the circle or trust within the meshed network of autonomous vehicles.

For example, represented in FIG. 2, the dotted arrows represent movement of autonomous vehicles (i.e., autonomous vehicle route and direction). In this particular example, autonomous vehicle-9, associated with area 9, is tasked with surveying the surrounding area for conservation purposes. In this example, autonomous vehicle-9 alerts autonomous vehicle-4 (the autonomous vehicle associated with area 4) of the task and instructs autonomous vehicle-4 to take over autonomous vehicle-9's task of surveying the surrounding area due to low battery life. In this example, autonomous vehicle-4 continues autonomous vehicle-9's task of surveying the surrounding area until autonomous vehicle-4 reaches area 5, wherein autonomous vehicle-4 instructs autonomous vehicle-5 to take over autonomous vehicle-4's task due to range limitations. In this example, autonomous vehicle-5 receives autonomous vehicle-4's instructions and continues the task received from autonomous vehicle-5 until autonomous vehicle-5 reaches area 8, wherein autonomous vehicle-5 instructs autonomous vehicle-8 to take over autonomous vehicle-5's task. As exemplified in this example, a network of autonomous vehicles may operate to complete a single task according to embodiments of the present invention.

Figure 3:
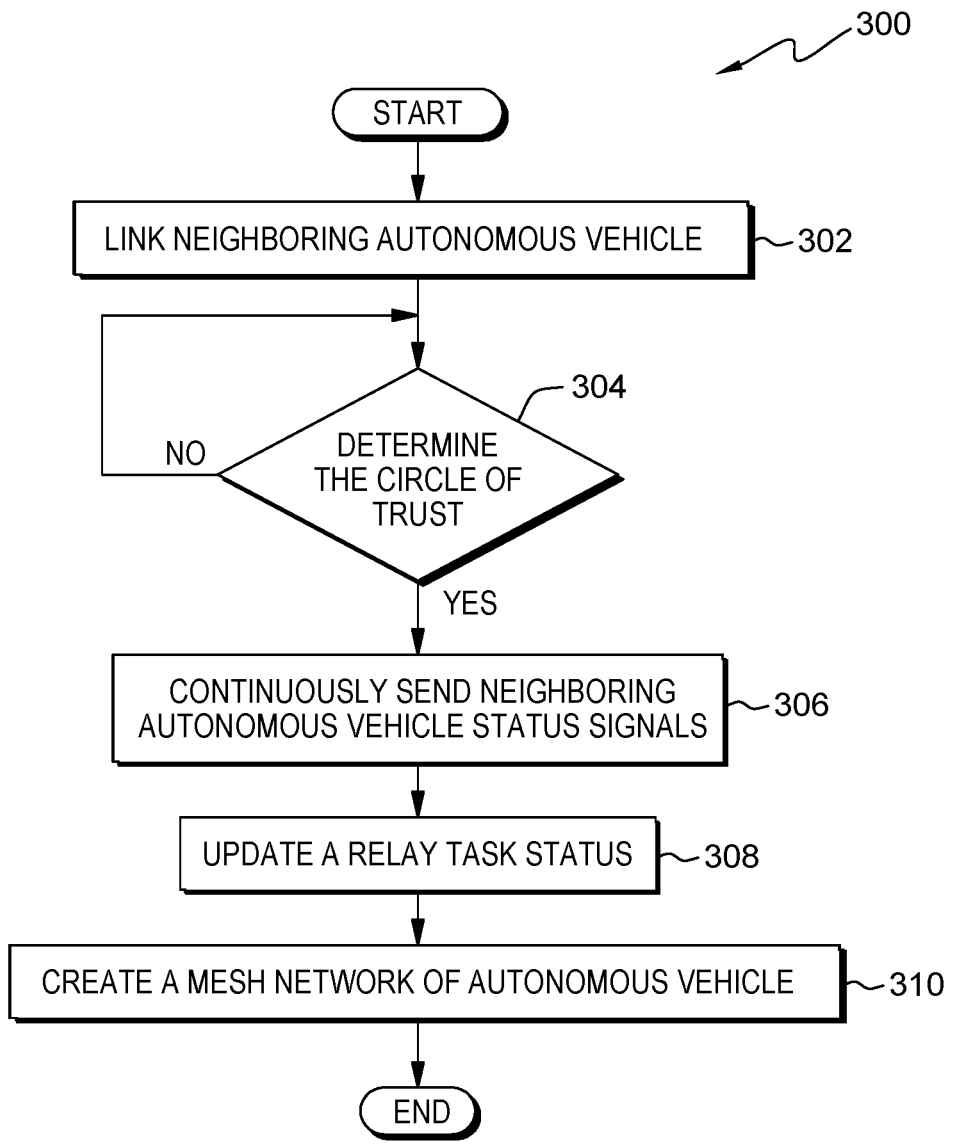
FIG. 3 illustrates operational steps of the federated autonomous vehicle mutuality component, in communication with an unmanned aerial vehicle within the distributed data processing environment of FIG. 1, for generating a mesh network of unmanned aerial vehicles, in accordance with an embodiment of the present invention.

FIG. 3 illustrates operational steps of autonomous vehicle mutuality component 112, generally designated 300, on computing device 110 within distributed data processing environment 100 of FIG. 1 for generating a mesh network of unmanned aerial vehicles, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

In step 302, autonomous vehicle mutuality component 112 pairs neighboring autonomous vehicles. In various embodiments of the present invention, autonomous vehicle mutuality component 112 can pair one or more neighboring autonomous vehicles to a first autonomous vehicle.

In step 304, autonomous vehicle mutuality component 112 determines the circle of trust. In various embodiments of the present invention, autonomous vehicle mutuality component 112 can determine the circle of trust between one or more neighboring autonomous vehicles based on the paired neighboring autonomous vehicles. In various embodiments of the present invention, autonomous vehicle mutuality component 112 can determine the circle of trust by issuing response prompts to the interested parties associated with the paired neighboring autonomous vehicles and/or the paired neighboring autonomous vehicles themselves. In various embodiments of the present invention, determining the circle of trust can be established based on the responses provided by the interested parties of the paired neighboring autonomous vehicles and/or the paired neighboring autonomous vehicles themselves. In various embodiments of the present invention, the circle of trust can be established through an authentication system that verifies each user and/or autonomous vehicle. In the depicted embodiment, if autonomous vehicle mutuality component 112 determines or establishes the circle of trust between one or more neighboring autonomous vehicles (Yes step) then autonomous vehicle mutuality component 112 can advance to step 306. In the depicted embodiment, if autonomous vehicle mutuality component 112 cannot determine the circle of trust exists between one or more neighboring autonomous vehicles (No step) then autonomous vehicle mutuality component 112 can loop back to step 302 or 304.

In step 306, autonomous vehicle mutuality component 112 continuously sends neighboring autonomous vehicles status signals. In various embodiments of the present invention, autonomous vehicle mutuality component 112 can continuously send the paired neighboring autonomous vehicles in the determined circle of trust status signals. In various embodiments of the present invention, autonomous vehicle mutuality component 112 can enable a plurality of autonomous vehicles to continuously communicate and send status signals to each other if the plurality of autonomous vehicles consists of paired neighboring autonomous vehicles in the determined circle of trust.

In step 308, autonomous vehicle mutuality component 112 updates a relay task status. In various embodiments of the present invention, autonomous vehicle mutuality component 112 can continuously update the interested parties of one or more autonomous vehicles relay task status based on the determined circle of trust.

In step 310, autonomous vehicle mutuality component 112 creates a mesh network of autonomous vehicles. In various embodiments of the present invention, autonomous vehicle mutuality component 112 can create one or more mesh networks of autonomous vehicles based on the paired neighboring autonomous vehicles in the determined circle of trust. In various embodiments of the present invention, the mesh network of autonomous vehicles created by autonomous vehicle mutuality component 112 can support a non-centralized task assignment feature to assign a task to a paired autonomous vehicle in the mesh network as needed. In various embodiments of the present invention, one or more paired autonomous vehicles in the mesh network can self-deploy based on a request from a partnered autonomous vehicle, such as a paired autonomous vehicle or an autonomous vehicle in the circle of trust. In various embodiments of the present invention, the mesh network of autonomous vehicles can support waypoint navigation such as self-deploy and task self-takeover management based on the associated attributes (task moving direction, distance, current and paired autonomous vehicle capability (battery life), and predefined rules of operation. In various embodiments of the present invention, the mesh network of autonomous vehicles enables the relaying of tasks from one autonomous vehicle to the next based on proximity to the current autonomous vehicle.

Figure 4:
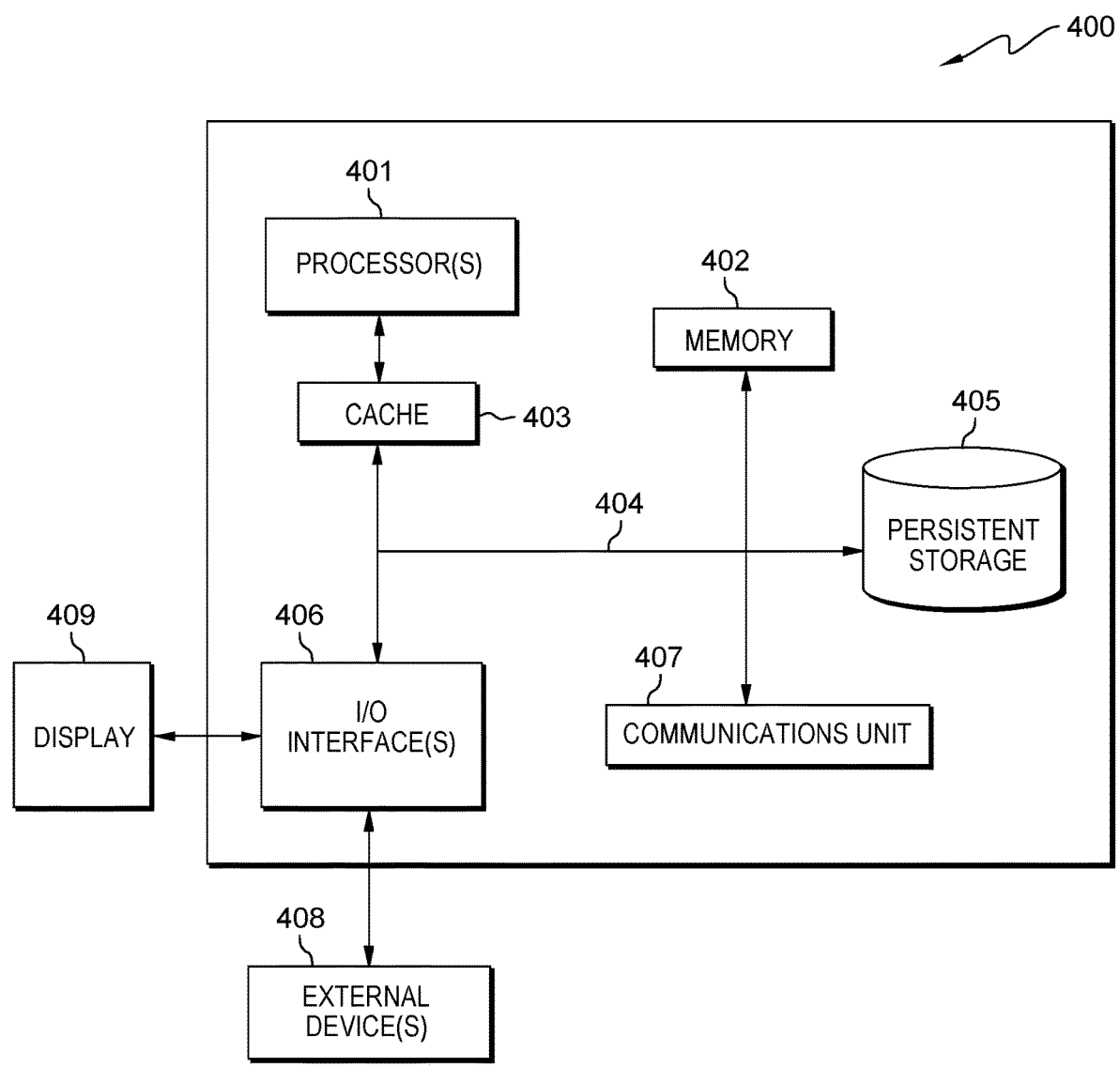
FIG. 4 depicts a block diagram of components of a computing device executing the federated autonomous vehicle mutuality component within the distributed data processing environment of FIG. 1, in accordance with an embodiment of the present invention.

FIG. 4 depicts a block diagram of components of computing device 110 and server computer 120, generally designated computer system 400, within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where computing device 110 represents an example of computer system 400 that includes autonomous vehicle mutuality component 112. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for creating a mesh network of autonomous vehicles, the computer-implemented method comprising:
   for a set of autonomous vehicles configured to perform joint tasks, creating a plurality of subset networks of autonomous vehicles based on geographical proximity, wherein the plurality of subset networks of autonomous vehicles overlap to form a mesh network of autonomous vehicles, and wherein the mesh network of autonomous vehicles and the subset networks of autonomous vehicles support a non-centralized task assignment feature to assign tasks to autonomous vehicles in the mesh network;

sending a status signal to a first autonomous vehicle in the mesh network via a second autonomous vehicle in the mesh network, wherein the first autonomous vehicle is in a same subset network of autonomous vehicles as the second autonomous vehicle; and determining a direction of an object, wherein determining the direction of the object comprises:
  computing an intersection between the first autonomous vehicle and the second autonomous vehicle in the meshed network in the direction the object is traveling;
  sending position updates to one or more interested parties in predetermined time intervals; and
  communicating autonomous vehicle flight information between the first autonomous vehicle and the second autonomous vehicle in the meshed network by exchanging position information, direction of travel, altitude, and speed to avoid collision.

2. The computer-implemented method of claim 1 further comprising:
  determining a circle of trust based on paired two or more neighboring autonomous vehicles, wherein the circle of trust is established through an authentication system.

3. The computer-implemented method of claim 1, wherein forming the mesh network of autonomous vehicles further comprises:
  creating the mesh network of autonomous vehicles based on the circle of trust and the subset networks of overlapping autonomous vehicles; and
  instructing an autonomous vehicle in the mesh network to continuously update one or more other autonomous vehicles in the one or more subset networks of an autonomous vehicle's task status and status signal.

4. The computer-implemented method of claim 1 further comprising:
  determining a paired autonomous vehicle is no longer sending status signals; and
  deploying one or more paired autonomous vehicles to a last known location of the paired autonomous vehicle that is no longer responsive to investigate why the paired autonomous vehicle is no longer responsive.

5. The computer-implemented method of claim 1 further comprising:
  sending alerts to one or more interested parties and one or more neighboring autonomous vehicles within a circle of trust that the object has been detected.

6. The computer-implemented method of claim 5 further comprising:
  following the detected object.

7. The computer-implemented method of claim 6 further comprising:
  determining a minimal distance is reached based on a predetermined range from an autonomous vehicles docking station or predetermined battery life;
  passing control to a closest neighboring autonomous vehicle in the mesh network; and
  task relaying an assigned task from a current autonomous vehicle to the one or more neighboring autonomous vehicles within the circle of trust when the object reaches a predetermined distance or reaches a predetermined geographical location.

8. A computer program product for creating a mesh network of autonomous vehicles, the computer program product comprising:
  one or more computer readable storage devices and program instructions stored on the one or more computer readable storage devices, the stored program instructions comprising:
    for a set of autonomous vehicles configured to perform joint tasks, program instructions to create a plurality of subset networks of autonomous vehicles based on geographical proximity, wherein the plurality of subset networks of autonomous vehicles overlap to form a mesh network of autonomous vehicles, and wherein the mesh network of autonomous vehicles and the subset networks of autonomous vehicles support a non-centralized task assignment feature to assign tasks to autonomous vehicles in the mesh network;
    program instructions to send a status signal to a first autonomous vehicle in the mesh network via a second autonomous vehicle in the mesh network, wherein the first autonomous vehicle is in a same subset network of autonomous vehicles as the second autonomous vehicle;
    program instructions to determine a direction of an object, wherein determining the direction of the object comprises:
      program instructions to compute an intersection between the first autonomous vehicle and the second autonomous vehicle in the meshed network in the direction the object is traveling;
      program instructions to send position updates to one or more interested parties in predetermined time intervals; and
      program instructions to communicate autonomous vehicle flight information between the first autonomous vehicle and the second autonomous vehicle in the meshed network by exchanging position information, direction of travel, altitude, and speed to avoid collision; and
    program instructions to pass control from the first autonomous vehicle to the second autonomous vehicle in the mesh network.

9. The computer program product of claim 8 further comprising:
  program instructions to determine a circle of trust based on paired two or more neighboring autonomous vehicles, wherein the circle of trust is established through an authentication system.

10. The computer program product of claim 8, wherein creating the mesh network of autonomous vehicles further comprises:
  program instructions to create the mesh network of autonomous vehicles based on the circle of trust and the subset networks of overlapping autonomous vehicles; and
  program instructions to instruct an autonomous vehicle in the mesh network to continuously update one or more other autonomous vehicles in the one or more subset networks of an autonomous vehicle's task status and status signal.

11. The computer program product of claim 8 further comprising:
  program instructions to determine a paired autonomous vehicle is no longer sending status signals; and
  program instructions to deploy one or more paired autonomous vehicles to a last known location of the paired autonomous vehicle that is no longer responsive to investigate why the paired autonomous vehicle is no longer responsive.

12. The computer program product of claim 8 further comprising:
 program instructions to send alerts to one or more interested parties and one or more neighboring autonomous vehicles within a circle of trust that the object has been detected.

13. The computer program product of claim 12 further comprising:
 program instructions to follow the detected object.

14. The computer program product of claim 13 further comprising:
 program instructions to determine a minimal distance is reached based on a predetermined range from an autonomous vehicles docking station or predetermined battery life; and
 program instructions to task relay an assigned task from a current autonomous vehicle to the one or more neighboring autonomous vehicles within the circle of trust when the object reaches a predetermined distance or reaches a predetermined geographical location.

15. A computer system for creating a mesh network of autonomous vehicles, the computer system comprising:
 one or more computer processors;
 one or more computer readable storage devices; and
 program instructions stored on the one or more computer readable storage devices for execution by at least one of the one or more computer processors, the stored program instructions comprising:
   for a set of autonomous vehicles configured to perform joint tasks, program instructions to create a plurality of subset networks of autonomous vehicles based on geographical proximity, wherein the plurality of subset networks of autonomous vehicles overlap to form a mesh network of autonomous vehicles, and wherein the mesh network of autonomous vehicles and the subset networks of autonomous vehicles support a non-centralized task assignment feature to assign tasks to autonomous vehicles in the mesh network;
   program instructions to send a status signal to a first autonomous vehicle in the mesh network via a second autonomous vehicle in the mesh network, wherein the first autonomous vehicle is in a same subset network of autonomous vehicles as the second autonomous vehicle; and
   program instructions to determine a direction of the object, wherein determining the direction of the object comprises:
     program instructions to compute an intersection between the first autonomous vehicle and the second autonomous vehicle in the meshed network in the direction the object is traveling;
   program instructions to send position updates to one or more interested parties in predetermined time intervals; and
   program instructions to communicate autonomous vehicle flight information between the first autonomous vehicle and the second autonomous vehicle in the meshed network by exchanging position information, direction of travel, altitude, and speed to avoid collision.

16. The computer system of claim 15, wherein creating the mesh network of autonomous vehicles further comprises:
 program instructions to create the mesh network of autonomous vehicles based on a circle of trust and the subset networks of overlapping autonomous vehicles, wherein the circle of trust is established through an authentication system; and
 program instructions to instruct an autonomous vehicle in the mesh network to continuously update one or more other autonomous vehicles in the one or more subset networks of an autonomous vehicle's task status and status signal.

17. The computer system of claim 15 further comprising:
 program instructions to determine a paired autonomous vehicle is no longer sending status signals; and
 program instructions to deploy one or more paired autonomous vehicles to a last known location of the paired autonomous vehicle that is no longer responsive to investigate why the paired autonomous vehicle is no longer responsive.

18. The computer system of claim 15 further comprising:
 program instructions to send alerts to one or more interested parties and one or more neighboring autonomous vehicles within a circle of trust that the object has been detected.

19. The computer system of claim 18 further comprising:
 program instructions to follow the detected object.

20. The computer system of claim 19 further comprising:
 program instructions to determine a minimal distance is reached based on a predetermined range from an autonomous vehicles docking station or predetermined battery life;
 program instructions to pass control to a closest neighboring autonomous vehicle in the mesh network; and
 program instructions to task relay an assigned task from a current autonomous vehicle to the one or more neighboring autonomous vehicles within the circle of trust when the object reaches a predetermined distance or reaches a predetermined geographical location.

* * * * *